April 6, 1965 R. L. CHASE 3,177,482

SERVO-STABILIZED ANALOG-TO-DIGITAL CONVERTER FOR HIGH RESOLUTION PULSE ANALYSIS

Filed July 18, 1962 3 Sheets-Sheet 1

INVENTOR.
ROBERT L. CHASE

BY

Roland A. Anderson
Attorney

INVENTOR.
BY ROBERT L. CHASE

Roland A. Anderson
Attorney

INVENTOR.
ROBERT L. CHASE
BY
Roland A. Anderson
Attorney

United States Patent Office 3,177,482
Patented Apr. 6, 1965

3,177,482

SERVO-STABILIZED ANALOG-TO-DIGITAL CONVERTER FOR HIGH RESOLUTION PULSE ANALYSIS

Robert L. Chase, Blue Point, N.Y., assignor to the United States of America as represented by the United States Atomic Energy Commission Filed July 18, 1962, Ser. No. 210,866
9 Claims. (Cl. 340—347)

This invention relates to a servo-stabilized analog-to-digital converter and more particularly to an analog-to-digital converter in which accuracy is obtained to one part in over four thousand by utilizing a digital servo-stabilized control system.

Recent improvements in the semi-conductor art have made the semi-conductor junction detector available for use in the measurement of charged particle energies with extremely high resolution which heretofore had not been attainable with other detection devices. In the 0 to 40 mev. yield range of particle energies the resolution of high quality detectors of this type up to now exceeded that of available pulse-height analyzers which are used to amplify, digitalize, and "count" the information detected.

While it is readily within the skill of the art to provide as many channels as required to count and record the information once in digital form, it is very difficult to amplify and convert the detector provided information into digital pulses as the stability of existing circuitry cannot readily be provided to insure accuracy to within one part in over four thousand. Thus, by increasing the number of channels in a pulse-height analyzer, it has been found that this does not assure that the system has sufficient resolution to identify and properly measure and record the distribution of the energy to the degree and the extent which is presently obtainable by these detectors. Therefore, full exploitation of the detector resolution requires that the various electronic circuitry receiving their signals from these junction detectors including the amplification stages and the analog-to-digital converter must have stability heretofore unrealized in conventional pulse-height analyzing systems.

It is possible by special techniques to obtain the system resolution required to transmit the information properly from the detector to the storage system. However, conventional stabilizing techniques involve negative feedback, temperature compensation, environmental control, etc. A system along these lines would require a very complicated arrangement with special high quality and critical components and would introduce a variety of incidental problems which would render such a system so expensive and difficult that it would be totally unsuitable for regular use and practice.

This invention solves the numerous problems mentioned above arising out of the development of the semi-conductor junction detector and obtains in a pulse-height analyzer the resolution and stability required for this use, as well as for general application in this area where high accuracy is desired. This is accomplished by a servo-stabilized system covering the amplification stages and the analog-to-digital converter so that the detector signal will be ultimately delivered to be stored in the proper channel of the pulse-height analyzer. The system incorporating this invention has the additional advantages that it is virtually drift-free, has very few critical components, requires no warm-up time, and can be shut-down, repaired and reassembled without calibration change. Furthermore, the servo-stabilized system of this invention has built into it assured long term stability without imposing unreasonable restrictions on individual component stability.

In a preferred embodiment of this invention there is provided the detector for producing a signal in accordance with the particular energy of the particles being measured, pre-amplification and linear amplification stages, followed by an analog-to-digital converter where there is produced a string of pulses in number which reflect the amplitude of the detector signal and hence the energy of the particles striking the semi-conductor junction diode detector. The converter delivers its pulses to a digital storage system having the proper number of channels, in this case 4096 channels, where the information is accumulated and stored. The purpose of this invention, as it pertains to the system just described, is to maintain the calibration of the pre-amplifier, the linear amplifier, and the analog-to-digital converter to one part in over four thousand so that the output of the converter will enter the proper channel of the analyzer and be thereby significant.

In accordance with this invention, a unique stable pulse generator arrangement produces a series of alternating reference pulses, one of these pulses being eight times as large in amplitude as the other pulse, supplied to the pre-amplifier to be mixed with the detector pulses. The mixed reference and detector pulses are amplified and converted in an analog-to-digital converter. The small reference pulses fall into channel 512 while the large reference pulses fall into channel 4096. The amounts by which the reference pulses miss their intended channels produce digital "error" signals which are then utilized to adjust the converter to maintain the latter compensated for all deviations and drifting which take place in the system. Because the "error" signals are digital in nature they do not drift or lose control even if an appreciable number of the reference pulses cannot be measured because the converter is busy with detector pulses.

It is thus a first object of this invention to provide a servo-stabilized radiation detection apparatus.

A further object is to provide an analog-to-digital converter which is stabilized by a digital servo system.

Another object is to provide a highly stabilized transistorized amplifier and analog-to-digital converter apparatus.

Still another object is to provide a servo-stabilized apparatus in which reference pulses in widely spaced channels are provided to produce inputs for the stabilizing portions of the system.

A further object of this invention is to provide a high resolution analog-to-digital converter having long term system stability with drift limited to less than one part in four thousand.

Still a further object is the provision of a high resolution analog-to-digital converter which has few critical components, no warm-up time and can be shut-down, repaired and reassembled without calibration change.

Other general and more specific objects and advantages of this invention will hereinafter become more evident from the following description of the accompanying drawings in which there is illustrated a preferred embodiment of this invention in which.

Figure 1:
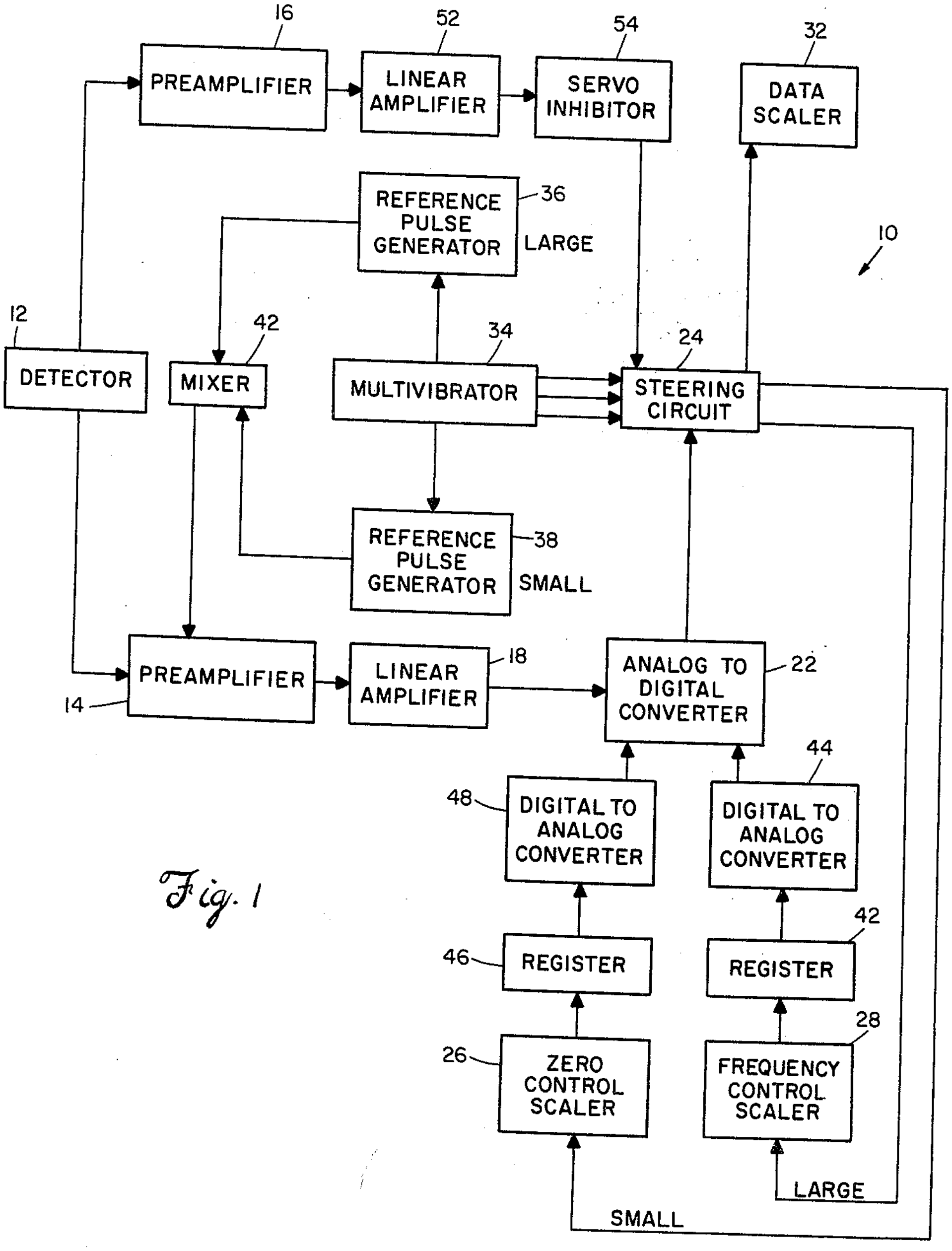
FIG. 1 shows an overall block diagram of the system comprising a preferred embodiment of this invention.

Referring to FIG. 1, there is shown servo-stabilized analog-to-digital converter 10 having a detector 12 which is a measuring or sensing device capable of producing pulses whose amplitude is to be measured and/or recorded with great accuracy. Detector 12 would be responsive to energetic, charged particles incident thereon at random intervals and may utilize a semi-conductor junction diode which provides extreme sensitivity to these charged particles. However, it is understood that detector 12 could be any source of pulses whose amplitudes are to be measured in the described manner.

Detector 12 delivers equal charge pulses of opposite polarity to each of two charge sensitive pre-amplifiers 14 and 16, respectively. The output of pre-amplifier 14 is passed to a linear amplifier 18 from which the signal passes to an analog-to-digital converter 22 which produces an output consisting of a series of digital pulses the number of which correspond to the amplitude of the input signal. The output of converter 22 is passed to a steering circuit 24 which is designed to route the pulses received from converter 22 to one of three locations namely, a zero control scaler 26, a frequency control scaler 28 or a data scaler 32. The latter receives the output of converter 22 originating from detector 12 as will be later seen.

In order to stabilize the circuit just described, there is provided a multivibrator 34 which activates alternately a pair of reference pulse generators 36 and 38, and acts in connection with steering circuit 24 to cause the latter to route the output of converter 22 in accordance with whether the latter is converting a pulse from generator 36, generator 38, or from detector 12. Reference pulse generator 36 produces pulses which in amplitude will fall into channel 4096 while reference pulse generator 38 produces pulses which would fall into channel 512 of this system after being treated in mixer 42. It will be noted that the amplitude of the output pulses from generator 36 is exactly eight times that of the output of generator 38 when leaving mixer 42 in which this relationship is established as will be later particularly described. Multivibrator 34 contains a pair of univibrators or "one shot" multivibrators (not shown) to respond to its change from one state to another to hold steering circuit 24 in its proper condition for a finite interval to allow time for this measurement of the pulses from 36 and 38, and contains also a gate to block the data scaler output of steering circuit 24 when the latter is routing the converter 22 output to scalers 28 or 26 as described below.

Figure 2:
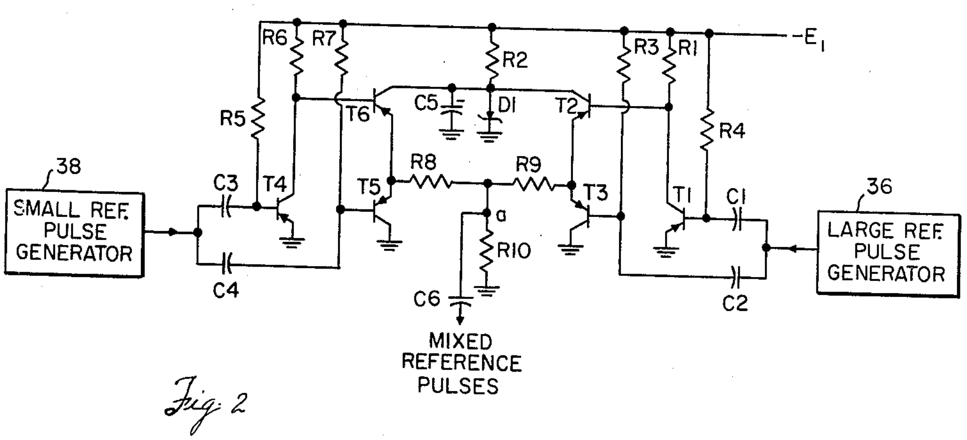
FIG. 2 shows details of the mixer and stabilizing circuit.
Figure 3:
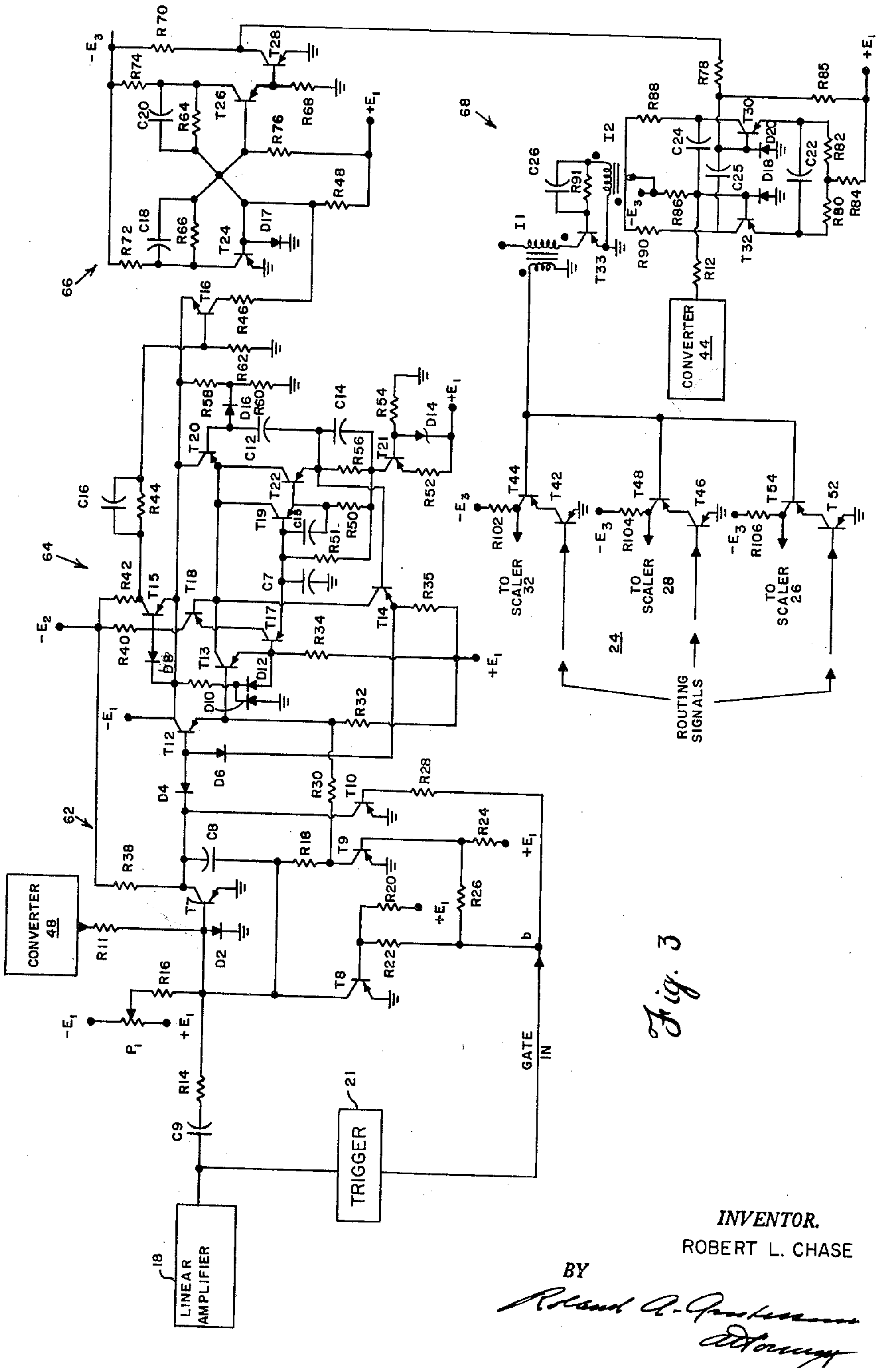
FIG. 3 shows details of the analog-to-digital converter and steering circuit.

The outputs of generators 36 and 38 are fed to a stabilizer mixer 42 where these signals are fixed accurately at their proper amplitudes, mixed and then transferred to preamplifier 14 where the pulse generator signals are mingled with the input from detector 12. The output of preamplifier 14 is then amplified and subsequently treated as to be more specifically described below. The circuit details of mixer 42 are shown in FIG. 2 and will be described in connection therewith while details of converter 22, steering circuit 24, and multivibrator 34 are illustrated in FIG. 3.

When multivibrator 34 activates either generator 36 or generator 38 to produce a pulse, multivibrator 34 simultaneously activates steering circuit 24 to transfer the resulting output of converter 22 to frequency control scaler 28 or zero control scaler 26, respectively.

Frequency control digital scaler 28 has ten binary stages for a capacity of 1024 counts. Any digital signal fed into frequency control scaler 28 having a number of counts which is an exact integral multiple of 1024, as for example, exactly 4096 pulses, will result in a final scaler count exactly equal to the initial scaler count, as is understood in the art. If on the other hand any signal input to the scaler 28 other than an integral multiple of 1024 will result in a final scaler count which is not equal to the initial scaler count. If there were more than 4096 pulses the residual count would then be increased by the excess of above 4096 and if there were fewer than 4096 pulses then scaler 28 would be decreased by the deficit.

After scaler 28 receives a count from steering circuit 24 initiated by pulse generator 36, the count is transferred to register 42. The latter is identical to scaler 28 except that it merely stores the information received by scaler 28. After scaler 28 receives the full count a final pulse transfers the information from each stage directly to the opposite stage in register 42, to free scaler 28 for the next count. The signal stored in register 42 is converted to a voltage by digital-to-analog converter 44 and transferred to converter 22 to control the converter clock frequency in the latter.

In a similar manner zero control scaler 26 has nine stages with a capacity of 512 counts. The residual count in zero control scaler 26 after receiving a signal from generator 38 is then increased or decreased by the excess or deficit of counts when compared with 512, and is transferred over to a register 46. The digital content of register 46 is transferred to digital-to-analog converter 48 to control the zero bias supply of converter 22 as will be more particularly described further below. Converters 44 and 48 are merely diode-controlled resistance ladders as are well known in the art for this purpose.

As was noted earlier detector 12 delivers a pulse to pre-amplifier 14 and simultaneously an inverted charge pulse to pre-amplifier 16. The output of pre-amplifier 16 is further amplified in a linear amplifier 52 and delivered to a servo-inhibiter 54 which delivers its output to steering circuit 24. The purpose of the arrangement just described is to inhibit the operation of steering circuit 24 when by chance a reference pulse coincides with a pulse from detector 12 whereby such mixing or contamination could unbalance the servo-system a substantial fraction of the time.

Details of this arrangement will be given further below.

Before describing details of the various novel portions of the system schematically shown in FIG. 1, a brief description of the operation of the whole system follows:

Detector 12 produces a series of charge pulses to be measured and recorded by this system, and these pulses are passed in opposite sense to pre-amplifiers 14 and 16. A particular pulse delivered to pre-amplifier 14 is amplified, passed to linear amplifier 18 for further amplification and to analog-to-digital converter 22 where a digital output is delivered to steering circuit 24. The latter routes the signal, in the absence of a pulse from multivibrator 34, to data scaler 32 where the information is stored and accumulated in the proper channel of any convenient digital storage system known in the art provided it has at least 4096 channels for this embodiment of the invention.

In order to stabilize the operation of the circuitry described and to insure that the circuit will have as high resolution as detector 12 and deliver the detector pulses to the proper channel in scaler 32, pulse generators 36 and 38 are activated alternately by multivibrator 34 to produce pulses which will have amplitudes placing them in channels 4096 and 512, respectively, if the system is properly adjusted. Multivibrator 34 activates these generators alternately at some convenient rate, as for example, 50 pulses per second, and simultaneously indicates to steering circuit 24 which generator pulse is being produced, or in the absence of a generator pulse, the system is processing a pulse from detector 12 (that is, a pulse appearing between pulses produced by generators 36 and 38), so that the output of converter 22 will be routed correctly. Multivibrator 34 indicates through its pulsing of steering circuit 24 whether the output of converter 22 should go to frequency control scaler 28 or zero control scaler 26, depending on whether the pulse being processed is from generator 36 or generator 38. In any event, the outputs of generators 36 and 38 are stabilized and mixed in mixer 42 and fed into amplifier 14 where the reference pulses are mixed with detection pulses for amplification and passed to analog-to-digital converter 22.

Assume that reference pulse generator 36 delivers a pulse to mixer 42 which is then subsequently amplified and delivered to analog-to-digital converter 22. Simultaneously, steering circuit 24 has been energized by multivibrator 34 through a univibrator (not shown) to route the output of converter 22 to frequency control scaler 28. As pointed out previously, scaler 28 has ten binary stages or a capacity of 1024 counts which is one-fourth the number of counts provided for in channel 4096 which is an exact integral multiple of the capacity of scaler 28. If the output of converter 22 to scaler 28 is exactly 1024 counts, then the final state of scaler 28 after receiving 1024 counts will be exactly as it was before the output of converter 22 was delivered to it.

However, should the signal input to scaler 28 be other than an integral multiple of 1024, the final scaler count on scaler 28 will not be identical to the initial scaler count. Thus, if there are more than 1024 counts then the residual count on scaler 28 will be increased over an exact multiple. The final condition of scaler 28 is transferred directly to register 42 to leave scaler 28 free to receive further signals. The state of register 42 is transferred to converter 44 where the information is converted to a voltage amplitude which is then fed to converter 22 to reduce the "error" signal detected by scaler 28 to zero or slow-down the frequency of the "clock" oscillator in converter 22 to thus correct the system for the drifting which occurred.

In a similar fashion the output of reference pulse generator 38 should produce from digital converter 22, 512 counts which the zero control scaler 26 receives and where any errors accumulate and then are transferred to register 46. Register 46 transfers its information to converter 48 where the deviation is converted to analog form and is used in analog-to-digital converter 22 to adjust a bias in the latter to reduce this deviation. As was pointed out earlier, the details of how these controls are exercised will be described further below.

FIG. 2 illustrates the details of mixer 42 shown in box form in FIG. 1. In the arrangement shown in FIG. 2, reference pulse generators 36 and 38 may be both sides of a single multivibrator operating at about 50 cycles per second. In order to standardize the amplitudes of the reference pulses and supply them to preamplifier 14 there are provided two sets of saturated transistor switches operating between ground and a zener diode stabilized reference potential as will now be described. For the large reference trigger coming from generator 36 there is provided an input transistor T–1 and switching transistors T–2 and T–3. The input pulses are passed through capacitors C–1 and C–2 to the bases of transistors T–1 and T–3, respectively. Transistor T–1 is connected with its emitter to ground and its collector through a resistor R–1 to a source —E1.

Transistors T–2 and T–3 are connected with their emitters in common and the collector of the latter grounded. The collector of the former leads through a resistor R–2 to source —E1. The base of transistor T–2 is connected to the collector of transistor T–1 while the base of transistor T–3 is connected through a resistor R–3 to the source —E1 as well as capacitor C–2. A resistor R–4 is connected between the base of transistor T–1 and source —E1. It will be noted that transistor T–3 (and transistor T–5 to be later described) has its collector grounded and hence is reversed from what would be considered a normal arrangement. During its quiescent, saturated condition all current is drawn out of the base. The electrodes in contact with resistors R–1 and R–2 are at a somewhat lower voltage by a few millivolts than the grounded electrode. As an emitter electrode junction is smaller in area than the collector junction, the drop in voltage is smaller than it would be reversed in each case and somewhat closer to ground level.

Similarly the small reference trigger from generator 38 is passed through a pair of small capacitors C–3 and C–4 to the bases of transistors T–4 and T–5 respectively. The collector of the latter is connected to ground and the emitter connected to the emitter of a transistor T–6 whose collector is connected to source —E1 through resistor R–2. Resistors R–5, R–6 and R–7 complete this arrangement for the smaller trigger similar to the arrangement of resistors R–1, R–3 and R–4. Wire wound resistors R–8, R–9 and R–10 connect between the emitters of transistors T–5 and R–3 and ground. In the particular embodiment the wire wound resistors R–8, R–9, and R–10 are selected to mix the signals from generators 36 and 38 in a ratio of eight to one. The output is taken from the common connection *a* through a charging capacitor C–6. A zener diode D–1 between ground and the collectors of transistors T–2 and T–6 maintains a contant voltage while an electrolytic capacitor C–5 in parallel with zener diode D–1 completes the arrangement. In the arrangement just described, wire wound resistors R–8 and R–9 and R–10, zener diode D–1, and the saturation voltage drops in transistors T–2 and T–3, T–5 and T–6 are highly critical. Zener diode D–1, for example, must control the voltage to within one part in more than four thousand to insure that the amplitudes of the output reference pulses from contact *a* will be accurate in absolute value to this same degree.

The circuit of FIG. 2 operates as follows:

Between pulses or triggers delivered by generators 36 and 38, transistors T–1 and T–4 are each in a saturated, quiescent state thereby grounding their collectors and the bases of transistors T–2 and T–6 which as a result are each in an off-state. Transistors T–3 and T–5 are substantially at ground and there is no output of the circuit in the absence of any pulses from generators 36 and 38. Zener diode D–1 maintains capacitor C–5 charged to some constant negative value and hence, capacitor C–5 acts as a battery or voltage source. When a reference trigger is delivered from generator 36 to the bases of transistors T–1 and T–3 they both become blocked thereby dropping the voltage on the base of transistor T–2 causing saturation of the later and the switching of contact *c* from substantially ground to the potential held by zener diode D–1. Due to current flow through resistors R–9, R–10, transistor T–2 and resistor R–2 a voltage pulse will be produced on connection *a* to be delivered via capacitor C–6 to pre-amplifier 14. C–6 is a small, stable capacitor which converts the reference voltage pulses to charge pulses. In a similar fashion transistors T–4 and T–5 and T–6 deliver a reference pulse to pre-amplifier 14. If the amplitudes of the output pulses are measured exactly from zero then the large reference pulse will be eight times the amplitude of the small pulse. Assuming that channel 0 is for a zero amplitude pulse, which is not critical, then the ratio of pulses will be 8:1. While substantially the case, the amplitude of the zero channel signal is not critical to the operation of this system.

Table I lists the parameters for a circuit constructed as in FIG. 2:

TABLE I

| Part | Transistor Type | Resistance | Capacitance | Voltage |
|---|---|---|---|---|
| D–1 | 1N827 | | | |
| T–1, T–4 | 2N140 | | | |
| T–2, T–3, T–5, T–6 | 2N580 | | | |
| R–1, R–6 | | 1K | | |
| R–2 | | 620 | | |
| R–3, R–7 | | 12K | | |
| R–4, T–5 | | 6.2K | | |
| R–8 | | 4K | | |
| R–9 | | 500 | | |
| R–10 | | 100 | | |
| C–1, C–2, C–3, C–4 | | | .001 $\mu f$ | |
| C–5 | | | 10 $\mu f$ | |
| C–6 | | | 1.8 pf | |
| $V_b$ | | | | —6 v. |
| $V_c$ (T–2 saturated) | | | | —6 v. |
| E–1 | | | | —12 v. |

The details of analog-to-digital converter 22 and steering circuit 24 are shown in FIG. 3. The input signal to converter 22 from linear amplifier 18 is through a capacitor C–9 and a resistor R–14. Control input from digital-to-analog converter 48 is through a resistor R–11. Control input from digital-to-analog converter 44 is through a resistor R–12. The output of analog-to-digital converter 22 is from the secondary of transformer I–1 to steering circuit 24 which will be described more particularly further below.

Converter 22 consists of an input or zero control section 62, a rundown section 64, a flip-flop section 66, and a clock oscillator section 68. As will be seen from a description in more detail further below, a rundown capacitor C–7 in section 64 is charged to a value which reflects the magnitude of the input signal from linear amplifier 18 and therefore the time of rundown which is maintained by the circuitry at a uniform rate is indicative of the amplitude of the input signal. The construction and operation of rundown section 64 is similar to that in my patent application entitled, "Transistorized Analog-to-Digital Converter," S.N. 6,831, filed February 4, 1960, now Patent No. 3,140,479 issued July 7, 1964. The flip-flop section 66 acts in response to rundown capacitor C–7 to control the operation of oscillator section 68 so that the number of pulses delivered by section 68 is in direct proportion to the amplitude of the signal input from amplifier 18. The control signal from converter 48 establishes the zero or starting value for adjustment purposes of the input signal as described in connection with FIG. 1 whereas the control signal from converted 44 regulates the frequency control of oscillator section 68 in accordance with the output of converter 44.

As already noted, the input to converter 22 is from amplifier 18 to the base of transistor T–7 for amplification, and also to a trigger circuit 21 for producing a gating input to a contact *b*. The output of transistor T–7 is from the latter's collector to the base of transistor T–12. Diode D–2 connected to ground, resistor R–11 already mentioned, resistor R–16, and a potentiometer P–1, the latter for making initial zero adjustment of the circuit, complete the first stage of converter 22. Potentiometer P–1 is connected between −E1 and +E1 voltage sources.

Transistors T–8, T–9, and T–10, are provided to block off input signals to converter 22 except when permitted to do so by a signal from trigger circuit 21. Resistors R–18, R–20, R–22, R–24, R–26, R–28 and R–30, complete the gating arrangement with the gating signal arriving at junction *b* leading to the bases of all transistors T–8, T–9 and T–10. Transistors T–8, T–9 and T–10, normally (in the absence of a gating signal) are conductive so that the base of transistor T–7, collector of transistor T–7, and the base of transistor T–12, are kept at ground and nonresponsive to incoming signals from amplifier 18. When a signal from linear amplifier 18 is produced, trigger circuit 21 will produce a gate-in signal which will cut off transistors T–8, T–9 and T–10 thereby permitting converter 22 to receive the signal from amplifier 18. By utilizing trigger 21, it is possible to limit the range of an input signal to which converter 22 will respond; thus, trigger 21 can be adjusted not to fire or produce a gate-in signal when the output of amplifier 18 is above or below a certain value.

The output of transistor T–7 is delivered through diode D–4 to the base of transistor T–12 as already noted. The latter is an emitter follower which delivers its output to a transistor T–13 which in turn drives transistor T–17. The latter charges up capacitor C–7. Transistor T–7 is an inverter and together transistors T–7 and T–12 constitute a feedback pair.

The emitters of transistor T–12, T–13 and a transistor T–14 are connected through resistors R–32, R–34 and R–35 to a +E1 source of voltage. Transistor T–14 is part of a feedback arrangement to limit the reverse base to emitter voltage of T–17 while capacitor C–7 is running down.

Transistors T–18, T–15, T–16 are utilized to set the state of flip-flop 66 in accordance with whether capacitor C–7 is or is not running down. These transistors are powered from sources −E1 and −E2 through resistors R–40, R–42, and R–44. The output of transistor T–15 is delivered from its collector to the base of transistor T–16. The collector of transistor T–16 is connected through resistors R–46 and A–48 to voltage source +E1.

Transistors T–14, T–19, T20, T–21 and T–22 are provided to insure that during rundown of capacitor C–7, the potentials on transistor T–17 will be held at a constant value to permit the linear rundown to proceed to the very end, and then to cause transistor T–17 to become quiescent once more at the instant that capacitor C–7 is fully discharged.

A variety of resistors R–50, R–51, R–52, R–54, R–56, R–58, R–60 and R–62, diode D–16 and capacitors C–12, C–14 and C–15 complete this portion of the circuit. A zener diode D–14 is connected between the base and the emitter of transistor T–21 in order to maintain there a constant voltage.

Flip-flop 66 consists of a pair of transistors T–24 and T–26 having their bases and collectors interconnected by resistors R–64 and R–66 and capacitors C–18 and C–20 to form a bi-stable arrangement whose state depends on the output of transistor T–16. The emitter of transistor T–24 is grounded directly while the emitter of transistor T–26 is grounded through a resistor R–68 for supplying the output of flip-flop 66 to transistor T–28, whose emitter is grounded and whose collector is connected through a resistor R–70 to source −E3, respectively, and a resistor R–76 between the base of transistor T–26 and +E1. Circuit 66 is completed by collector resistors R–72 and R–74, and a diode D–17.

The output of the flip-flop 66 is taken from the collector of transistor T–28 and delivered through a resistor R–78 to the base of a transistor T–30 in clock oscillator 68. Oscillator 68 is a free-running multivibrator consisting of a pair of transistors T–30 and T–32 with the emitters thereof connected through resistors R–80, R–82 and R–84, as illustrated to +E1 and a small capacitor C–22. The base of transistor T–32 is connected to source −E3 through a high valued current leakage resistor R–86. The collectors of transistors T–30 and T–32 are connected through small resistors R–88 and R–90, respectively, to the opposite ends of a primary coil in a transformer I–2 which delivers the output pulses of clock oscillator 68. The center tap of the primary winding in I–2 is connected to −E3. The frequency input control from converter 44 is through resistor R–12 to the base of transistor T–32. A signal arriving at this point controls the frequency of clock oscillator 68. Small capacitors C–24 and C–25 are connected between the base of transistor T–32 and the collector of transistor T–30, and the base of the latter with the collector of the former, respectively. A large resistor R–85 joins source +E1 and resistor R–78.

A pair of diodes D–18 and D–20 connect the bases of transistors T–32 and T–30 to ground to limit the negative base potential excursions and, thereby, to prevent transistor saturation. The pulse output of transformer I–2 is delivered to a transistor T–33 through resistor R–91 and capacitor C–26, and through transformer I–1 to steering circuit 24 for power amplification.

Converter 22 shown in FIG. 3 operates in the following manner:

Zero control section 62 receives the input signal from linear amplifier 18 on the base of transistor T–7. The latter is biased by adjustment of potentiometer P–1 and the servo control signal from digital-to-analog converter 48 which also arrives on the base to transistor T–7 to alter the bias by supplying some current in accordance with the signal deviation from channel 512 as noted above in connection with FIG. 1. This in effect controls the quiescent voltage level of capacitor C–7 and hence its ultimate potential at the end of the period of time during which oscillator 68 runs. As described in my application, S.N. 6,831, in rundown section 64, condenser C–7 is charged to a value which is a direct function of the input on the base of transistor T–7. The gate into transistors T–8, T–9 and T–10, unblocks the input to converter 22 just when proper signal as detected by trigger 21 is coming. Before capacitor C–7 becomes fully charged, transistors T–17 and T–18 are in quiescent states while transistors T–15 and T–16 are non-conductive. This causes transistor T–24 in flip-flop 66 to be blocked so that the latter is in a state with transistors T–26 and T–28 conductive. During rundown (discharge) of capacitor C–7 through resistor R–51 at a constant current rate, transistors T–15 and T–16 become conductive as transistors T–17 and T–18 become blocked so that multivibrator 66 is in the state with transistor T–24 on and transistors T–26 and T–28 blocked. This drops the voltage on the base of transistor T–30 to release oscillator 68 (as later seen) to run during the period of condenser C–7 rundown and hence produce output pulses on transformer I–2 during the period capacitor C–7 is discharging.

Clock oscillator 68 is a free running multivibrator which runs when capacitor C–7 is discharging, that is, when flip-flop 66 is in a state in which transistors T–26 and T–28 are non-conductive. A unique feature of oscillator 68 is that its active elements, transistors T–30 and T–32, never go into saturation thereby permitting faster operation (i.e. 20 megacycles) heretofore not possible with transistorized multivibrators. For example, when transistor T–32 begins to conduct, feedback from its collector to the base of transistor T–30 through small capacitor C–25 (e.g. going from −5 volts to −1 volt on T–32 collector) cuts off transistor T–30. The collector of transistor T–32 stays at some slight voltage as about 1 volt below that of its emitter. With transistor T–28 non-conductive, capacitor C–25 will be recharged through resistors R–78 and R–70 from the −E3 source with the leakage current rate established by the combined values of R–78 and R–70. When capacitor C–25 charges down to −E3 (e.g. −5 volts) transistor T–30 will begin to conduct causing feedback through capacitor C–24 to terminate conduction in transistor T–32. The collector of transistor T–30 rapidly reaches its steady state condition at about one volt below that of its emitter and capacitor C–24 is charged through resistor R–86 from the source −E3.

When transistor T–30 is conducting its base is held at ground by diode D–20. Similarly, when transistor T–32 is conducting, diode D–18 is conducting and holding the former's base at ground. The input signal from converter 44 alters the rate at which capacitor C–24 becomes recharged and in this unsymmetrical way varies in the order of 1%, the frequency of clock oscillator 68. For more or less equally shaped and sized pulses produced on transformer I–2, it is understood that resistor R–86 should be substantially equal tothe sum of R–78 and R–70.

Transistor T–33 along with resistor R–91 and capacitor C–26 transferring the output of transformer I–2 to the input of transformer I–1 acts as a power amplifier to insure that the pulses have sufficient amplitude to energize steering circuit 24.

Steering circuit 24 which receives the pulses of oscillator 68 through transformer I–1, consists of three transistor pairs for routing the signals from transformer I–1 to data scaler 32, frequency control scaler 28, or zero control scaler 26. The first pair of transistors T–42 and T–44 in series with a resistor R–102 between −E3 source and ground deliver the data scaler signal from the collector of transistor T–44. The second pair of transistors T–46 and T–48 in series with resistor R–104 similarly arranged route the frequency control signal; while the third pair of transistors T–52 and T–54 and resistor R–106 route the zero control signal. The base of each of transistors T–44, T–48 and T–54 is connected to one end of the secondary of transformer I–1. The bases of transistors T–42 and T–46 and T–52 receive routing signals from multivibrator 34. With multivibrator 34 in either state (not in the process of switching) a voltage is delivered from multivibrator 34 to the base of transistor T–42 to keep the latter and transistor T–44 conductive so that normally this routing circuit is kept open for detection signals to be delivered to data scaler 32. When multivibrator 34 is in the process of switching into a state whereby reference pulse generator 36 is caused to initiate a pulse, a univibrator (not shown) included in multivibrator 34 delivers a pulse for a finite period of time to the base of transistor T–46 causing transistors T–46 and T–48 to conduct, thereby passing through a signal from transformer I–1 through transistor T–48 to the frequency control scaler 28. When multivibrator 34 is switching to a state whereby generator 38 is caused to initiate a pulse, a pulse is similarly delivered to the base of transistor T–52 rendering the latter and transistor T–54 conductive. When either of T–46, T–48 or T–52, T–54 routing pair of transistors are conducting, a gate (not shown) included in multivibrator 34 produces a pulse which blocks transistor T–42.

The components of a circuit constructed as in FIG. 3 are listed in Table II.

TABLE II (A) *Transistors*

| Part: | Type |
|---|---|
| T–7, T–8, T–9, T–10, T–12, T–18, T–20, T–24, T–26, T–28, T–30, T–32, T–33 | 2N1500 |
| T–13, T–15, T–19, T–22 | 2N393 |
| T–14, T–21 | 2N140 |
| T–16 | 2N1091 |
| T–17 | 2N344 |
| D–2, D–4, D–6, D–10, D–16 | 1N100 |
| D–8, D–18, D–20 | Q6–100 |
| D–12 | 1N144 |

(B) *Resistors*

| | |
|---|---|
| R–11, R–12, P–1 | 10K |
| R–14, R–22, R–26, R–28, R–54, R–60, R–66 | 1K |
| R–16, R–62, R–76 | 24K |
| R–18, R–72, R–74, R–88, R–90 | 200 |
| R–20, R–24 | 36K |
| R–30 | 820 |
| R–32, R–35 | 12K |
| R–34 | 6.2K |
| R–36, R–38, R–42, R–58 | 3K |
| R–40 | 30K |
| R–44 | 1.5K |
| R–46 | 2K |
| R–48 | 3.3K |
| R–50 | 470K |
| R–51 | 75K |
| R–52 | 5.6K |
| R–56 | 27K |
| R–64 | 2.4K |
| R–68, R–102, R–104, R–106 | 51 |
| R–70, R–78, R–84 | 620 |
| R–80, R–82 | 62 |
| R–85 | 6.8K |
| R–86 | 1.2K |
| R–91 | 510 |

(C) *Capacitors*

| | | |
|---|---|---|
| C–6, C–12, C–14 | μf | .1 |
| C–8, C–26 | pf | 50 |
| C–7 | pf | 3300 |
| C–16 | pf | 200 |
| C–18, C–20 | pf | 56 |
| C–22 | pf | 150 |
| C–24, C–25 | pf | 39 |

(D) *Power supply*

| | | |
|---|---|---|
| E1 | v | 12 |
| E2 | v | 15 |
| E3 | v | 5 |

Figure 4:
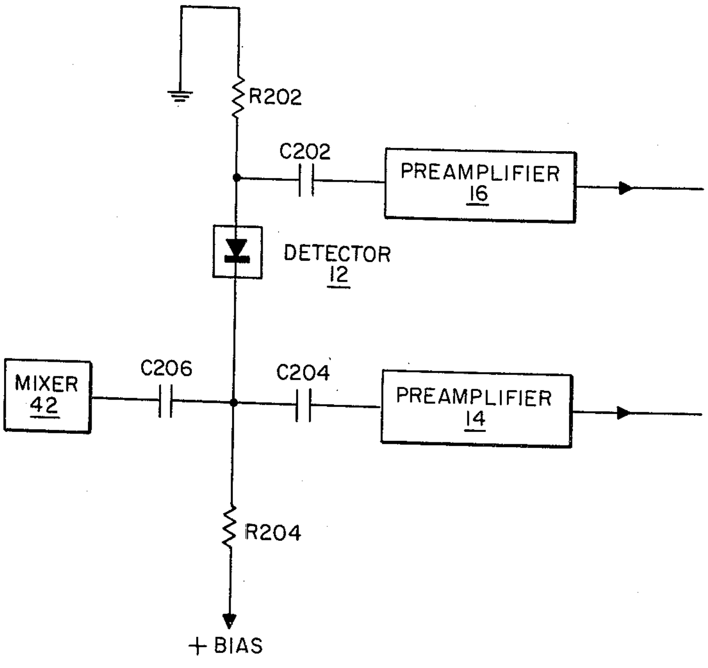
FIG. 4 shows details of the arrangement for rejecting reference pulses contaminated by detector signals.

FIGURE 4 illustrates details of the arrangement used to recognize and reject contaminated reference pulses. Detector 12 delivers equal charge pulses of opposite polarity to charge sensitive pre-amplifiers 14 and 16 through capacitors C–204 and C–202. The reference pulse charge, on the other hand, goes through capacitors C–204 and C–206, primarily to pre-amplifier 14, pre-amplifier 16 receiving a small fraction of the reference pulse charge equal to the ratio of the detector capacitance to the pre-amplifier input capacitance. The pre-amplifier input capacitance is normally very large, being equal to the feedback capacitance multiplied by the internal loop gain. That portion of the pulse generator signal charge which does go to preamplifier 16 is opposite in polarity to the detector signals, whereas, in preamplifier 14, they have the same polarity. The output of pre-amplifier 14 would be used for both servo-control and measurement. Output signals from pre-amplifier 16 would be used to inhibit the operation of the servos. Because of the digital nature of the servos, they are not adversely affected by occasional interruptions.

While only a preferred embodiment of this invention has been described and illustrated, it is understood that many modifications thereof may be made without departing from the principles of this invention as defined in the appended claims.

I claim:

1. In an analog-to-digital converter and storage system, means for receiving and amplifying a series of signal pulses of varying amplitudes, converter means for receiving said amplified pulses and converting each of the latter into a digital output consisting of a series of pulses whose number is proportional to the amplitude of each said signal pulse, and multi-channel storage means for receiving and storing the digital outputs, the improvement in said system comprising: means for producing reference pulses of predetermined amplitude, means for passing said reference pulses into said system for producing a digital output for each of said reference pulses, means for counting the number of pulses in each reference pulse digital output and producing an error signal representing the difference between said number and the number of pulses exactly proportional to the amplitude of each said reference pulse, and means for utilizing said error signal to adjust said converter means in the direction of cancelling said error signal to maintain said converter and storage system drift-free.

2. The system of claim 1 in which said converter means includes an adjustable zero input bias and said error signal is supplied to adjust said bias in the direction of cancelling said error signal.

3. The system of claim 1 in which said converter means includes a clock oscillator which runs for a period of time proportional to the amplitude of an input pulse, said error signal altering the frequency of said oscillator in the direction of cancelling said error signal.

4. The system of claim 1 having steering circuit means to receive the digital outputs of said converter means to pass the signal digital ouptuts to said storage means and the reference digital outputs to said counting means.

5. The system of claim 4 having means to inhibit said steering circuit means to block the passage therethrough of all pulses when a reference pulse is contaminated by a signal pulse.

6. The system of claim 5 in which said reference pulses consist of alternating pulses of two differing amplitudes, there being a counting means for each of the reference pulse digital outputs producing separate error signals and separate utilizing means for adjusting said converter means simultaneously and independently, and said steering circuit means identifying and passing said reference pulse digital outputs to their proper counting means.

7. A servo-stabilized analog-to-digital converter comprising, in combination, means for receiving and amplifying a series of signal pulses of varying amplitudes, converter means for receiving said amplified pulses and converting each of the latter into a digital output consisting of a series of digital pulses whose number is proportional to the amplitude of each said signal pulse, means for producing a series of spaced reference pulses of predetermined amplitude, means for transferring said reference pulses into said amplifying means for mixing both of the aforementioned series of pulses, thereby resulting in a converter means output consisting of digital outputs corresponding to the signal and reference pulses, scaler means for receiving the digital outputs of said converter means derived from said reference pulses, and scaler means counting the pulses in each of the received said digital outputs to accumulate error counts representing the difference in the produced digital output and the preselected digital output for each of the said reference pulses, means converting said error counts into an error signal when said error counts accumulate to a predetermined number, and means for transferring said error signal into said converter means for adjusting the latter in the direction of cancelling said error signal thereby to control the operation of said servo-stabilized analog-to-digital converter to within very close limits of accuracy.

8. The analog-to-digital converter of claim 7 in which there are means responsive to said reference pulse producing means for steering the converter digital output derived from a reference pulse to said scaler means.

9. A servo-stabilized analog-to-digital converter comprising, in combination, means for receiving and amplifying a series of input signal pulses whose amplitudes are to be measured and stored in digital form, converter means for receiving the amplified signal pulses and converting each of the latter into a digital output consisting of a series of pulses whose number is a measure of the amplitude of its input signal pulse, means for producing a series of spaced reference pulses of at least two alternating predetermined amplitudes, means for transferring said reference pulses into said amplifying means for mixing both of the aforementioned series of pulses, thereby the converter means producing an output consisting of a series of digital outputs corresponding to the input signal and reference pulses, first scaler means for receiving the digital outputs of said converter means derived from the larger amplitude reference pulses and counting the pulses in each of the received digital outputs to accumulate error counts representing the difference in the produced digital output and the preselected digital output for each of the said larger reference pulses, second scaler means for receiving the digital outputs of said converter means derived from the smaller amplitude reference pulses and counting the pulses in each of the received digital outputs to accumulate error counts representing the difference in the produced digital output and the preselected digital output for each of the said smaller reference pulses, first and second means for converting said error counts into error signals when said error counts in said first and second scaler means, respectively, accumulate to predetermined numbers, and means for transferring said error signals into said converter for adjusting the latter in the direction of cancelling said error signals, thereby to control the operation of said servo-stabilized analog-to-digital converter to within close limits of accuracy.

References Cited by the Examiner

UNITED STATES PATENTS

| | | | |
|---|---|---|---|
| 2,961,648 | 11/60 | Sacks et al. | 340—347 |
| 2,962,705 | 11/60 | Relis et al. | 340—347 |
| 2,994,767 | 8/61 | Rose | 325—319 |
| 2,997,578 | 8/61 | England | 325—319 |

MALCOLM A. MORRISON, *Primary Examiner.*